June 25, 1929.  C. R. SHORT  1,718,588

COMPOSITE PISTON

Filed Feb. 19, 1926

Inventor

CHARLES R. SHORT

By Blackmore, Spencer & Phil

Attorneys

Patented June 25, 1929.

1,718,588

UNITED STATES PATENT OFFICE.

CHARLES R. SHORT, OF DAYTON, OHIO, ASSIGNOR TO GENERAL MOTORS RESEARCH CORPORATION, OF DETROIT, MICHIGAN, A CORPORATION OF DELAWARE.

COMPOSITE PISTON.

Application filed February 19, 1926. Serial No. 89,360.

This invention relates to improvements in pistons for internal-combustion engines, and particularly to the composite metal pistons having the head and skirt made of different metals.

One object is to provide an improved method of joining the head and skirt so that the joint will remain tight over the working range of engine temperatures, although the coefficients of expansion of the metals may be different.

Another object of the present invention is to eliminate the use of the ordinary sand core in the casting process of pistons and, consequently, eliminate the necessity of cleaning out the interior of the piston head to rid the same of any sand adhering to its interior walls.

Another object of the invention is to provide the interior surface of a piston head with a lining which is comparatively smooth, thereby substantially reducing carbon deposits in this portion of the piston.

Further objects and advantages of the present invention will be apparent from the following description, reference being had to the accompanying drawings, wherein a preferred form of the present invention is clearly shown.

Figure 1:
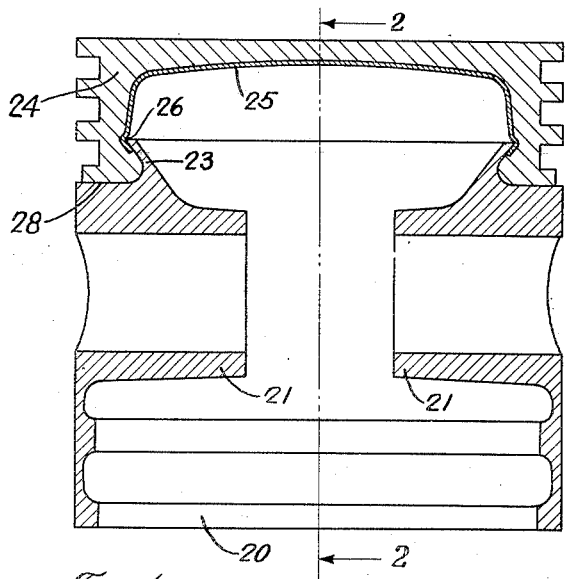
Fig. 1 is a cross-sectional view of the piston taken along the line 1—1 of Fig. 2.
Figure 3:
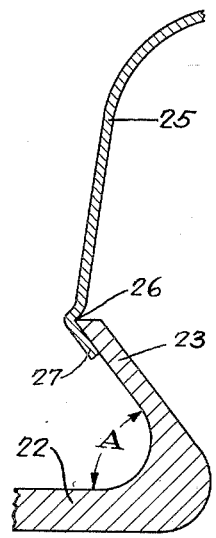
Fig. 3 is a fragmentary sectional view of the piston skirt flange and its cap, this view being on a larger scale than the other views.
Figure 2:
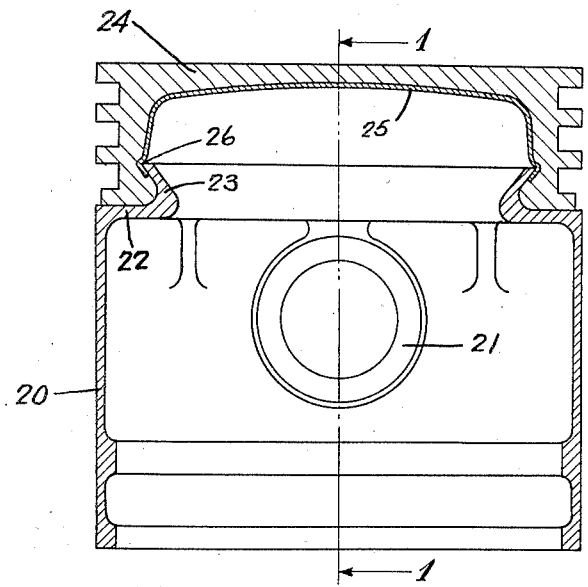
Fig. 2 is a cross-section taken along the line 2—2 of Fig. 1.

Referring to the drawings, numeral 20 designates the piston skirt, which is provided with diametrically opposite piston pin bosses 21. The skirt 20 is provided with an inwardly-extending circular flange 22 which merges into an outwardly-flared conical flange 23. The angle between the conical flange 23 and the circular flange 22 will depend upon the coefficients of expansion of the metals forming the head and skirt. The head, being usually formed of a metal of good heat conductivity, such as aluminum, will have usually a greater coefficient of expansion than the metal of the skirt, which may be steel, for example. Such being the case, the head 24 will tend to expand radially faster than the flange 23. This would tend to loosen the joint between the flange 23 and the head 24, were it not for the fact that the head metal received by the annular groove between the flanges 22 and 23 increases in dimensions parallel to the axis of the piston at a rate greater than the rate of increase of the dimensions of said groove relative to the piston axis. In other words, the metal of the head located in the groove defined by flanges 22 and 23, can be caused to swell to compensate for the tendency to loosen the joint between the head and skirt, which tendency is due to differences in radial expansion of the head and skirt. This effect can be produced by properly relating the flanges 22 and 23. The angle between these flanges, indicated "A" in Fig. 3, can be determined with relation to the metals forming the head and skirt. If the skirt is of steel and the head is of aluminum, the angle "A" is preferably 52.75 degrees.

In pistons of this type, the piston head is cast on the skirt member. This casting process generally comprises placing the skirt member in a suitable mold, then placing a core within said skirt, which will give the piston head the proper inside shape. The outside shape of the piston head is controlled, of course, by the mold, including the skirt member.

Where sand cores are used, the inner wall is generally rough and uneven, causing portions of the core to adhere thereto. Due to the formation of the interior of some pistons, it is sometimes very difficult to remove such adhering portions of sand and, if they are not removed and the piston is so used, the lubricant might later loosen them and they would then tend to do damage in the engine. A rough interior in the piston head also quickly collects excessive carbon deposits, which affect the temperature of the head and thus affects operation of the engine.

To overcome these disadvantages, the sand core is replaced in the present invention, by the use of a metal cap 25 which is adapted to be placed in position on the flange 23. This cap is formed to the shape desired for the interior wall of the piston head 24. Adjacent its edge, the cap 25 is provided with a groove 26 which fits about the outer edge of the flange 23. After the cap is placed in position on the said flange, the portion of the cap between the groove 26 and its edge is spun over the flange to secure the cap to the flange 23. The skirt 20 with its cap 25 is then placed in the casting mold and the piston head is then cast.

From this it may be seen that the cap 25 performs two functions; first, it acts as a core upon which the material of the piston head 24 is cast, and secondly, it provides a smooth lining for the interior of the piston head. As the result of the first function, the cap maintains accurately the desired dimensions of the piston head; and, as the result of the second function, the rough interior of the head is eliminated, thus, avoiding the necessity of cleaning out the interior of the piston and also reducing the deposits of carbon at this region to a substantial degree.

While the form of embodiment of the invention as herein disclosed, constitutes a preferred form, it is to be understood that other forms might be adopted, all coming within the scope of the claims which follow.

What is claimed is as follows:

1. A piston having a cylindrical skirt provided adjacent one end thereof with a circular flange merging into an outwardly-flaring conical flange, and having a head of a metal of greater coefficient of expansion than the skirt and provided with a portion which fills the annular groove between said flanges, said flanges being so related that the tendency of the joint between the head and skirt to loosen due to the greater radial expansion of the head is compensated by the tendency of said portion to increase in dimensions relative to the axis of the piston.

2. A composite piston comprising a skirt and a piston head cast on said skirt; and a sheet-metal cap adapted to fit on the skirt and provide a casting form for the interior of the piston head.

3. A composite piston comprising a skirt including wrist pin bosses and a flange at one end of said skirt, said flange extending inwardly toward the axis of the skirt and having a flared portion extending outwardly from the skirt; a cap of sheet metal adapted to fit about the peripheral edge of the flared portion; and a piston head cast on the skirt and cap.

4. A composite piston comprising a skirt including wrist pin bosses and a flange at one end of said skirt, said flange extending inwardly toward the axis of the skirt and having a flared portion extending outwardly from the skirt; a cap of sheet metal having a peripheral groove formed near its edge, said grooves being adapted to fit about the peripheral edge of the flared portion; and a piston head cast on the skirt and cap.

5. A piston having a skirt provided with a depression and having a piston head of a metal of greater co-efficient of expansion than the skirt and provided with a portion which fills the depression to form an interlocking joint between the skirt and head, the abutting walls of the head and skirt being so arranged that the tendency of said joint to loosen due to greater expansion of the head in one direction is compensated by the expansive increase in dimensions in another direction.

In testimony whereof I affix my signature.

CHARLES R. SHORT.